July 18, 1939.  P. HEINISCH ET AL  2,166,147
MOTION PICTURE CAMERA
Filed Dec. 12, 1936  4 Sheets-Sheet 1

Inventor
Paul Heinisch
Karl Schencke

By  a.D.adams

Attorney

July 18, 1939.　　P. HEINISCH ET AL　　2,166,147
MOTION PICTURE CAMERA
Filed Dec. 12, 1936　　4 Sheets-Sheet 3

Paul Heinisch
Karl Schencke
Inventor

By A. D. Adams
Attorney

July 18, 1939.  P. HEINISCH ET AL  2,166,147
MOTION PICTURE CAMERA
Filed Dec. 12, 1936   4 Sheets-Sheet 4

Inventor
Paul Heinisch and
Karl Schencke

By A. D. Adams
Attorney

Patented July 18, 1939

2,166,147

UNITED STATES PATENT OFFICE 2,166,147

MOTION PICTURE CAMERA

Paul Heinisch and Karl Schencke, Berlin, Germany, assignors to Askania-Werke A. G., a corporation of Germany Application December 12, 1936, Serial No. 115,599
In Germany December 13, 1935

4 Claims. (Cl. 88—16.2)

This invention relates to motion picture cameras of the type which, for taking quick shots, is adapted to be supported by the shoulder of the operator.

Cameras of this type have proved very advantageous for taking news-reel pictures or scenes which do not permit of the use of a tripod for supporting the camera. The weight of the camera in operative position, in distinction from the usual amateur motion picture camera, is not borne by the arms of the operator which when moving with the breathing chest cause the picture to become unsteady, but by the shoulder of the operator giving a steady support.

The invention has for its object the provision of a camera involving numerous material improvements, such as interchangeable magazines of different film capacity, sound-recording devices and others, giving the camera many valuable capacities and advantages over previous motion picture cameras without however impairing the essential property of the camera of being supportable on the shoulder of the operator.

The objects and advantages will appear from a consideration of the description which follows with the accompanying drawings showing an embodiment of the invention for illustrative purposes. It is to be understood that this detailed description is not to be taken in a limiting sense, the scope of the invention being defined by the appended claims.

Referring to the drawings.

Figure 1:
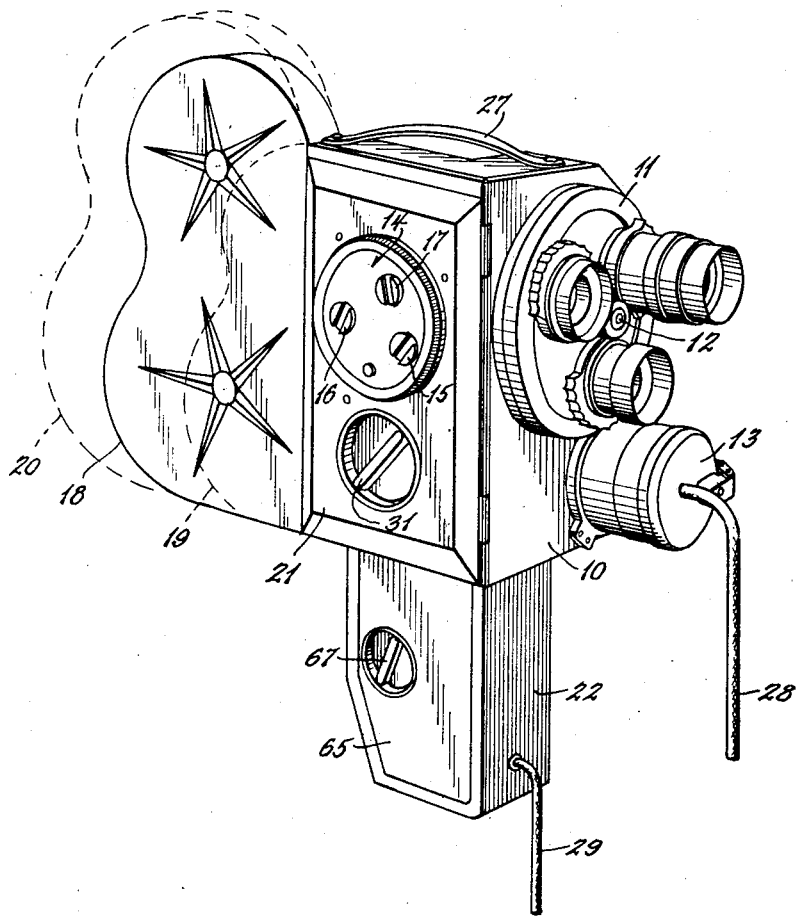
Fig. 1 is a perspective front view of a motion picture camera of the "shoulder type" with magazine and sound recorder attached.
Figure 2:
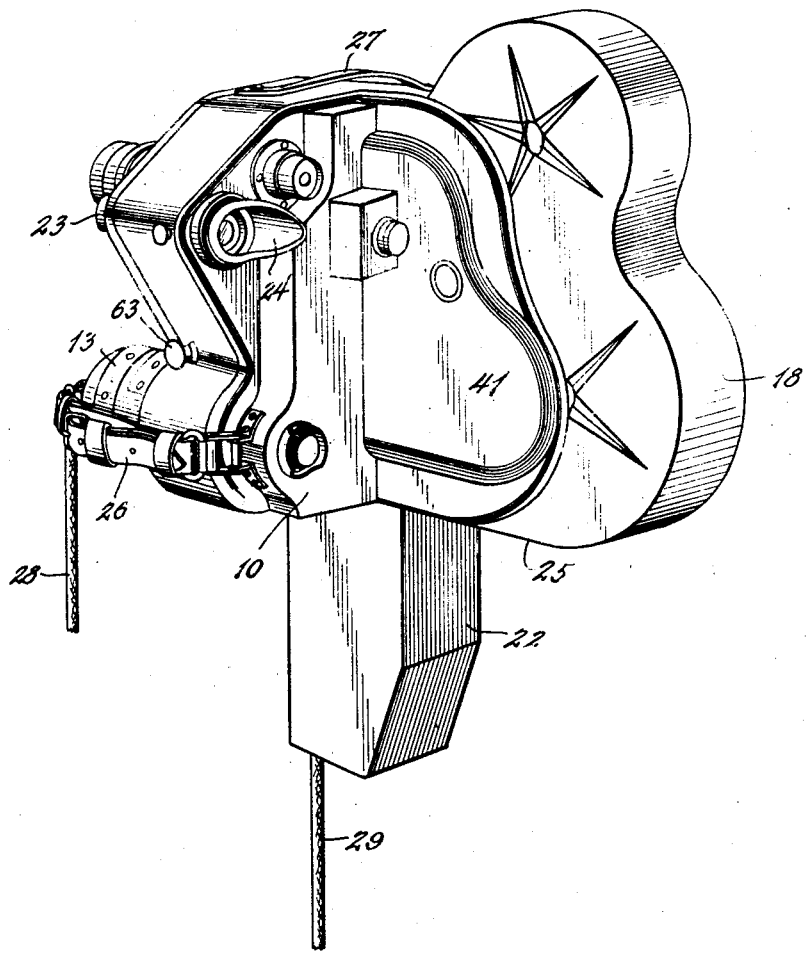
Fig. 2 is a perspective rear view of the camera shown in Fig. 1.

In Figs. 1 and 2 the camera casing 10 is shown as provided with a multiple lens turret 11 rotatable about a center hub 12. An electric motor 13 provides the force for moving the camera mechanism enclosed in the casing. In addition there is shown a manually operable driving gear 14 having three stub shafts 15, 16, and 17 adapted to receive a hand-crank (not shown) for operating the camera where electric power is not available.

Film magazines 18, 19, and 20 of different size, the latter two indicated by dotted lines, are attachable to the camera casing when the door 21 is in an open position. A sound recorder 22 for taking sound pictures is shown as attached below the camera casing.

A view finder 23 is provided in the camera casing, having an eye-piece 24. The camera is adapted to be carried by the operator on his shoulder. For this reason the distance of the eye-piece 24 from the lower wall 25 of the magazine 18 on which the camera is supported, is made substantially equal to the distance of the human eye above the shoulder. The sound recorder extends downwardly in front of the chest of the operator without impeding the easy handling of the camera. The left hand of the operator suitably rests in the loop formed by a strap 26 and the camera- and motor-casings 10 and 13. A further leather strap 27 serves for carrying the camera. Cords 28 and 29 connect the motor and sound recorder with the power supply and sound apparatus (not shown), respectively.

Figure 3:
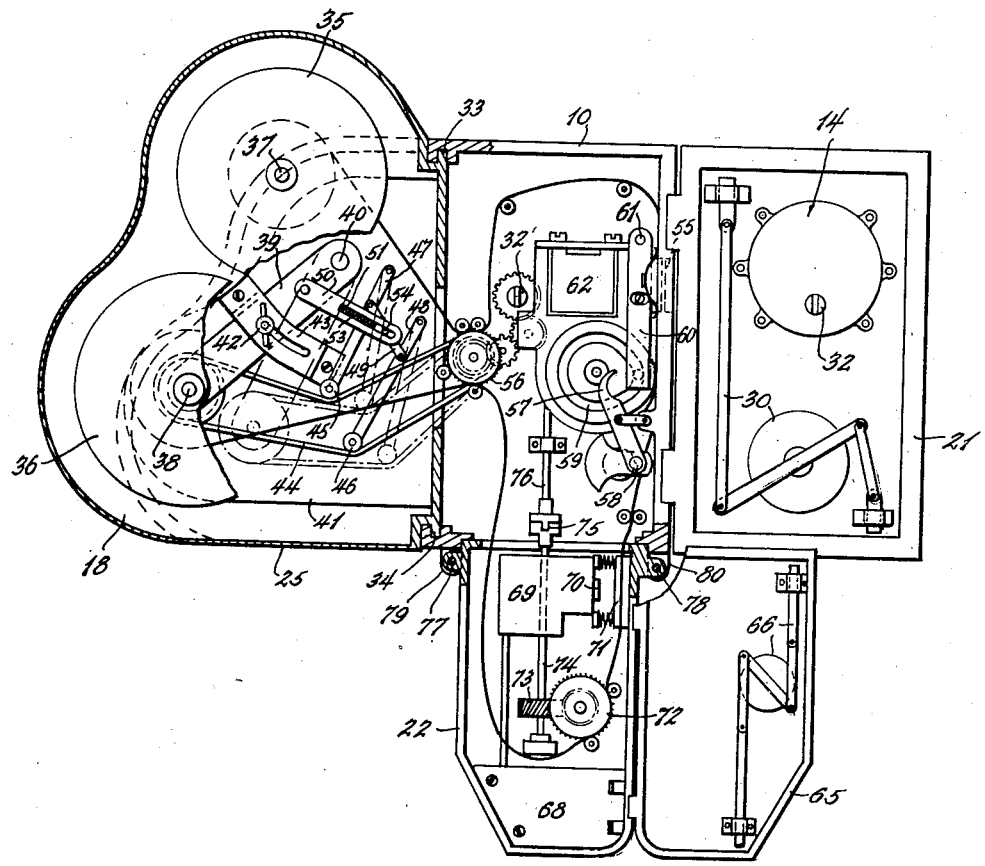
Fig. 3 is a side elevation, partly in section, of the camera shown in Figs. 1 and 2, the doors of the camera casing and sound recorder being opened.

The interior of the camera is shown diagrammatically in Fig. 3. The mechanism is shown in greatly simplified form some parts being omitted for the sake of clearness.

The interior of the camera is accessible by opening the door 21 provided with a mechanism 30 for bolting the same, operable by a handle 31 outside of the door. The manually operable driving gear 14 is equipped with a clutch 32 registering with the corresponding part 32' of the camera gear when the door is in the closed position.

A magazine is attached to the camera casing at 33, 34 containing two reels 35 and 36. The center spindle 37 of the reel 35 is fixed in the magazine while the second spindle 38 is shown as being carried by an arm 39 swingable about a pivot 40 in the wall 41 of the camera casing, and adjustable with regard thereto by suitable means such as a wing-nut 42 engaging a slotted bracket 43. The reel 36 is shown as connected to the camera gear by means of a belt-drive 44.

When a magazine of different film capacity is attached to the camera casing, the arm 39 is adjusted with regard to the position of the driven reel in the respective magazine. A second position of the arm corresponding to a magazine of smaller capacity is shown by dash-dot lines in Fig. 3. The tension of the belt is automatically adjusted by guide rollers 45 and 46 pivoted at the end of levers 47 and 48 interconnected by a link 49. The link 49 is connected to the arm 39 by resilient means such as a rod 50 having a slot 51 and spring 52 bearing against a pin 54 of the link 49.

The film is fed from the supply reel 35 to the exposure aperture 55 by means of a sprocket spool 56. The movement of the film past the aperture may be controlled by conventional means such as a finger 57 operated by a crank 58. An excentric cam 59 serves for operating the usual gate 60 hinged at 61. Behind the exposure aperture a prism 62 is shown for permitting observation of the scene through the film by means of the same eye-piece 24, which is associated with the view finder 23. A push-button 63 at the outside of the camera casing permits the operator to take his choice between the view finder proper and the exposure aperture, the optical means being of conventional construction, well known in the art, and not claimed in this application.

For taking sound pictures a sound recorder enclosed in a casing 22 is attachable to the camera casing. The mechanism of the recorder which is accessible through a door 65 with a locking device 66, 67 similar to that of the camera door, comprises an electrical recording apparatus and a mechanical film feeding mechanism. The electrical recording apparatus proper is diagrammatically shown as enclosed in casings 68 and 69, the latter containing the lamp for exposing the sound track of the film. The film is guided past the exposure opening 70 of the casing 69 and maintained in the proper position for exposure by suitable means, such as a spring loaded gate 71.

The feed of the film through the sound recorder is controlled by mechanical means shown as a sprocket spool 72 receiving its motion through a gear 73 and a shaft 74 detachably connected at 75 with a driving shaft 76 of the camera.

The exposed film is moved toward the second driven reel 36 by the sprocket spool 56.

The sound recorder may easily be removed from the camera casing by disengaging the attaching means shown as being pins 77, 78 in corresponding bores of hinges 79 and 80, if it is desired to take mute pictures.

Figure 4:
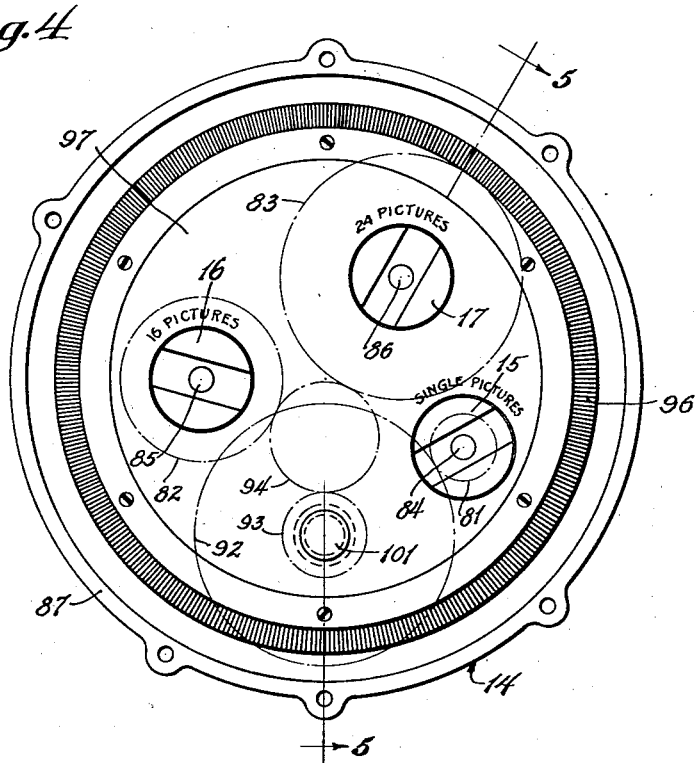
Fig. 4 is a side elevation of a manually operable driving gear.
Figure 5:
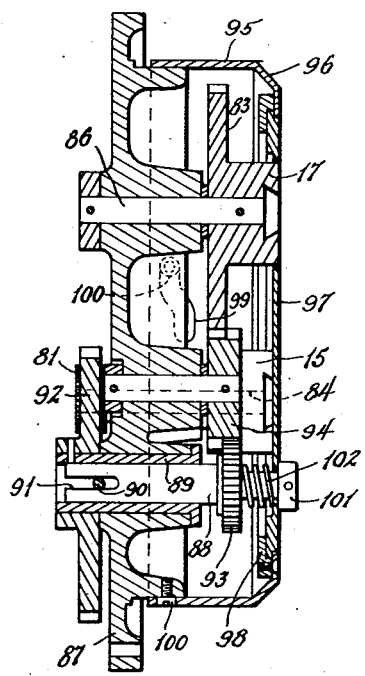
Fig. 5 is a sectional elevation along line 2—3 of the gear shown in Fig. 4.

The manually operable gear for driving the camera at places where no electric power for operating the motor 13 is available is shown in detail in Figs. 4 and 5.

Three gears 81, 82, and 83 secured to shafts 84, 85, and 86 are rotatably mounted in a baseplate 87. The shafts are provided with extensions or stubs 15, 16, and 17 adapted to receive a hand crank attachable thereto. A driven shaft 88 is axially movable in a bushing 89 which is rotatable in the baseplate. For transmission of the rotary movement there is shown a pin 90 engaging a slot 91 of the shaft 88. To the bushing there is secured a gear 92 while the shaft is provided with a gear 93 secured thereto and meshing with an intermediary gear 94.

As the operator is used to turn his crank at a rate of two revolutions per second, the gear ratios between the crank shafts 84, 85 and 86 and the driven shaft 88 of 8:1; 12:1 and 1:1 correspond to the three generally used exposure rates of 16 pictures per second for mute pictures, 24 pictures per second for sound pictures and one picture per revolution for single pictures.

For covering the gear a cap is provided comprising a cylindrical wall 95 having a preferably knurled rim 96 and a center plate 97 rotatable with regard to the cylindrical wall and held in place by a recessed ring 98. The cap is provided with spiral slots 99 engaging pins or screws 100 in the base plate and may by turning be raised and lowered with regard to the latter. In the lowered position the stub shafts 15, 16 and 17 will protrude from the cap and permit a crank to be attached to the shafts, while in the raised position the surface of the center plate will be at a level with the stub shafts.

For engaging and disengaging the gear with the camera gear there is provided a disengageable connection shown as being the slotted shaft 91 which for axial movement is further provided with means for engaging the axially movable cap shown as a head 101 having a larger diameter than the hole in the center-plate through which the shaft extends. The driving shaft is adapted to engage a pin or a blade shaped member 32' of the camera gear.

A spring 102 permits an axial movement of the driving shaft in case the door of the camera casing is closed while the shaft of the manually operable gear in a position as not to register with the corresponding member 32' of the camera gear, the same having a different phase position. The driving shaft will, in this instance move axially against the action of the spring until after a fraction of a revolution of the driving shaft the slot and corresponding pin or blade register and the shaft is moved by the spring into connection with the camera gear.

Obviously the present invention is not restricted to the particular embodiment thereof, hereinbefore shown and described. Moreover it is not indispensable that all the features of the present invention be used conjointly since they may be employed advantageously in various combinations and subcombinations.

What is claimed is:

1. In combination with a motion picture camera adapted to be rested on the shoulder of the operator for taking pictures, said camera having a casing, an exposure opening therein, a view finder including an eyepiece, and means for securing magazines to said casing, of a plurality of interchangeable magazines of different size having a lower wall which, when assembled with the camera casing, is at a distance below the eyepiece of said view finder which is substantially equal to the distance of the human eye above the shoulder whereby the correct view finder distance is maintained for all the magazines.

2. In combination with a motion picture camera adapted to be rested on the shoulder of the operator for taking pictures, said camera having a casing, an exposure opening therein, a view finder including an eyepiece, said eyepiece being arranged on said casing at a distance above the lower wall of the casing which is substantially equal to the distance of the human eye above the shoulder, and means for securing magazines to said casing, of a plurality of interchangeable magazines of different size having a lower wall which, when assembled with the camera casing, is substantially aligned with the lower wall of the camera casing thereby serving as rest of the camera on the shoulder of the operator while maintaining the correct view finder distance for all magazines.

3. In combination with a motion picture camera adapted to be rested on the shoulder of the operator for taking pictures, said camera having a casing, an exposure opening therein, a view finder including an eyepiece, said eyepiece being arranged on said casing at a distance above the lower wall of the casing which is substantially equal to the distance of the human eye above the shoulder, and means for securing magazines to said casing, of a plurality of interchangeable magazines of different size having a lower wall which, when assembled forms part of the lower wall of the camera casing and is aligned therewith whereby the correct distance of the viewfinder from the lower wall serving as camera rest is maintained for all the magazines.

4. In combination with a motion picture camera adapted to be rested on the shoulder of the operator for taking pictures, said camera having a casing, an exposure opening therein, a view finder including an eyepiece, means for securing magazines to said casing, and a plurality of interchangeable magazines of different size having a lower wall which, when assembled with the camera casing, is at a distance below the eyepiece of said view finder which is substantially equal to the distance of the human eye above the shoulder, of a sound recording apparatus; a casing for said apparatus; means for guiding film past the exposure aperture and through said recording apparatus; and means for securing said apparatus casing to said camera casing to extend downwardly from the fore part thereof, whereby the rear part of the lower wall of the magazine may be supported on the shoulder of the operator.

PAUL HEINISCH.
KARL SCHENCKE.